(12) United States Patent
Savir et al.

(10) Patent No.: US 12,346,340 B2
(45) Date of Patent: Jul. 1, 2025

(54) SEARCH ENGINE USING SELF-SUPERVISED LEARNING AND PREDICTIVE MODELS FOR SEARCHES BASED ON PARTIAL INFORMATION

(71) Applicant: Dell Products L.P., Round Rock, TX (US)

(72) Inventors: Amihai Savir, Newton, MA (US); Ofir Ezrielev, Be'er Sheva (IL); Oshry Ben Harush, Cedar Park, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 383 days.

(21) Appl. No.: 17/871,843

(22) Filed: Jul. 22, 2022

(65) Prior Publication Data
US 2022/0374446 A1    Nov. 24, 2022

Related U.S. Application Data

(63) Continuation-in-part of application No. 17/711,839, filed on Apr. 1, 2022, now Pat. No. 12,141,158, and a continuation-in-part of application No. 15/084,324, filed on Mar. 29, 2016, now abandoned.

(51) Int. Cl.
*G06F 17/00* (2019.01)
*G06F 16/25* (2019.01)
*G06F 16/901* (2019.01)
*G06F 16/9535* (2019.01)

(52) U.S. Cl.
CPC ........ *G06F 16/256* (2019.01); *G06F 16/9024* (2019.01); *G06F 16/9535* (2019.01)

(58) Field of Classification Search
CPC .............. G06F 16/256; G06F 16/9024; G06F 16/9535; G06F 16/9536; G06F 16/254
See application file for complete search history.

(56) References Cited

U.S. PATENT DOCUMENTS

| | | | |
|---|---|---|---|
| 8,775,365 B2* | 7/2014 | Hatami-Hanza | G06N 5/022 707/769 |
| 8,949,239 B2* | 2/2015 | Ruffner | G06F 16/9535 707/738 |
| 9,547,682 B2* | 1/2017 | Chaney | G06F 16/23 |
| 9,740,749 B2* | 8/2017 | Deshpande | G06F 16/24578 |
| 2006/0200556 A1* | 9/2006 | Brave | G06F 16/9535 709/224 |
| 2011/0197166 A1* | 8/2011 | Girgensohn | G06F 16/93 707/751 |
| 2013/0346464 A1* | 12/2013 | Cheng | G06Q 10/10 709/201 |
| 2016/0294961 A1* | 10/2016 | Cordes | G06Q 30/0631 |

* cited by examiner

*Primary Examiner* — Greta L Robinson
(74) *Attorney, Agent, or Firm* — Staniford Tomita LLP

(57) ABSTRACT

A search engine responding to a user query to find relevant data assets in a federation business data lake (FBDL) system by monitoring and recording interactions of known users interacting with data assets in the FBDL system. Predicted data usage for unknown or new users is derived by training a generative model that uses reconstructive self-supervised learning (SSL) techniques to generate possible values for missing data usage features of the unknown users. The predicted usage is then used to generate similarity scores that are combined for those of the known users to help inform the search engine processing to return relevant results to a target user.

19 Claims, 7 Drawing Sheets

| | DA-1 | DA-2 | DA-3 | DA-5 |
|---|---|---|---|---|
| User A | 0 | 0 | 1 | 0 |
| User B | 1 | 1 | 0 | 1 |
| User C | 0 | 1 | 0 | 0 |
| User D | 0 | 0 | 0 | 1 |

SEARCH ENGINE USING SELF-SUPERVISED LEARNING AND PREDICTIVE MODELS FOR SEARCHES BASED ON PARTIAL INFORMATION

CROSS-REFERENCE TO RELATED APPLICATIONS

This application is a Continuation-In-Part application and claims priority to U.S. patent application Ser. No. 17/711,839, filed on Apr. 1, 2022, which in turn, is a Continuation-In-Part application of U.S. patent application Ser. No. 15/084,324, filed on Mar. 29, 2016 and entitled "Recommendation Systems for Data Assets in Federation Business Data Lake Environments" and which is hereby incorporated by reference in its entirety.

TECHNICAL FIELD

Embodiments are generally directed to search engine technology, and more specifically to processing search queries for data stored in a large-scale data lake system.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Enterprise organizations face vast amounts of information pouring in at all times and need a way to leverage big data analytics in order to gain critical insights. Effectively utilizing big data poses significant process and technical challenges. The federation business data lake platform (FBDL), such as that developed by EMC Corporation, enables organizations to realize the value of analytics in much shorter time frames than normal (e.g., weeks or days as opposed to months). Using this platform, businesses are able to ingest, store, analyze, surface, and act on big data to make more informed decisions that could lead to real-time insights, better efficiencies, and new revenue streams.

The FBDL platform provides a central repository for all enterprise data in large organizations using big data (Big Data) processes and data sets. However, consolidation alone is only a first step to ensure effective utilization of data resources. Next steps typically involve documentation, governance and security policy. At present, however, no adequate solutions are provided for the process of data reuse and exploration (i.e., "punching holes through silos") beyond simple metadata search or breadcrumb audit trails of past users. As a result, users are not able to use many of the tools and solutions available throughout the system because they are typically not aware of existing data assets, such as sources, parsers, dashboards, and so on.

In most organizations, users typically only use data they are familiar with and retain old data warehousing practices. Furthermore, these organizations are typically divided into hierarchical and/or separate departments or business units, which are effectively organizational silos with respect to data searching and processing. Many data assets reoccur and overlap, and users typically do not leverage past practices, or practices in other business units regarding these data assets. Present platforms thus do not provide easy data collaboration between business units, which represent organizational silos, and any leveraging of data requires long manual efforts to identify relevant data assets for use by querying users. As a result, users are effectively fishing blindly through ever increasing amounts of data and data assets. Such inefficient collaboration wastes time effort and cost and generally reduces business efficiencies and innovation.

Finding data in present systems typically involves using a keyword-based search engine that simply matches query terms entered into the search engine with instances of the terms in the searched data assets. A certain number of data assets containing a highest number of matches is then returned to the user, who must then access and evaluate each returned data asset. These present search engine systems do not adequately utilize or leverage useful relationships between users querying the system and between certain users and the various different data assets. Such information can be exploited to more efficiently respond to queries by returning responses that are more relevant than those based on simple keyword matches.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
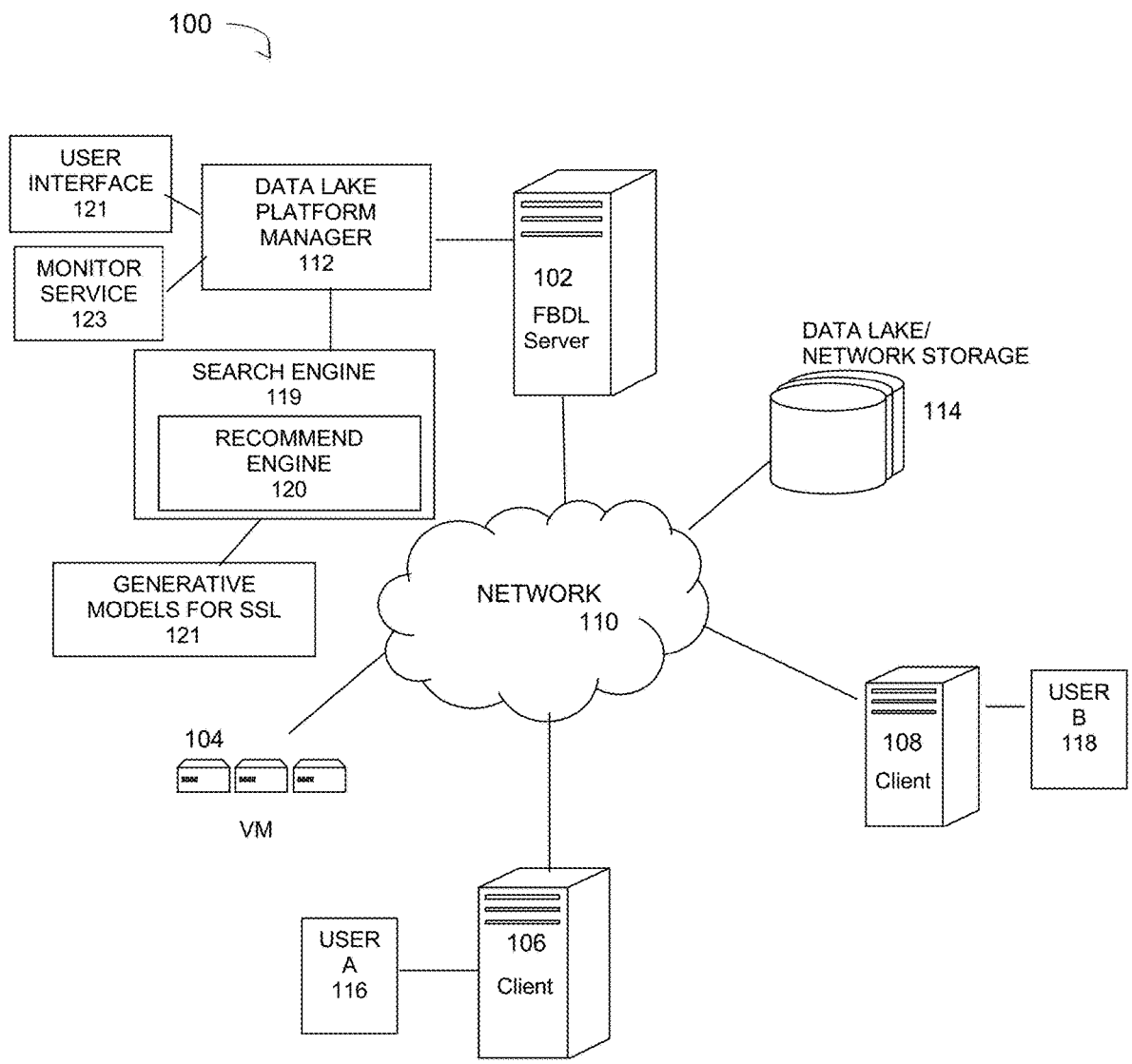
FIG. 1 illustrates a computer network system that implements one or more embodiments of a search engine used in a data lake storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

FIG. 1 illustrates a computer network system that implements one or more embodiments of a data lake search engine and recommendation system, under some embodiments. In system 100, client and server computers are coupled directly or indirectly to each other and other network elements through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application.

The data generated or sourced by system 100 may be stored in any number of persistent storage locations and devices, such as network storage 114. A backup process backs up this data to storage devices of the network, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (Open-Storage) devices.

The data stored and processed in system 100 may be any appropriate data, such as database data that is part of a database management system. In this case, the data may reside on one or more hard drives and may be stored in the database in a variety of formats. One example is an Extensible Markup Language (XML) database, which is a data persistence software system that allows data to be stored in XML format. Another example is a relational database management system (RDMS) which uses tables to store the information.

In an embodiment, system 100 represents a FBDL system that includes a large repository of data storage devices 114 which are accessed by a large numbers of users each operating respective client devices, such as users 116 (user A) and 118 (user B). System 100 represents a big data environment that includes data analytics processes used by a plurality of different users. The users are typically part of a very large organization (e.g., company, governmental agency, conglomeration, etc.) that may be referred to as an "enterprise" and that is organized into a number of different business units, such as sales, engineering, customer service, and so on. Many different structures are possible depending on the organization's size, type, hierarchical configuration, and so on, but are typified by a separation of employees and personnel into a number of separate and autonomous or semi-autonomous groups or departments. For purposes of data processing within the organization, such departments are often considered to be organizational silos, which imply that data within each department is utilized and processed internally without much interaction with other departments.

The organizational silo model is generally acceptable for smaller organizations that deal with reasonable size datasets and/or have adequate centralized control. As the size of the enterprise grows and the amount of data increases to very large scales, such siloing can become disadvantageous, especially in present big data environments that use huge data repositories, i.e., "data lakes." Big data generally refers to data sets that are so large (e.g., terabyte scale datasets) or complex that traditional data processing and interchange applications are inadequate. Special programs are thus used for various data processing tasks, such as data capture, analysis, storage, transfer, virtualization, querying, security, and so on. Users often use applications or programs to run predictive analytics or certain other advanced methods to extract value from data, which can be very large and/or complex sets of data.

Figure 2:
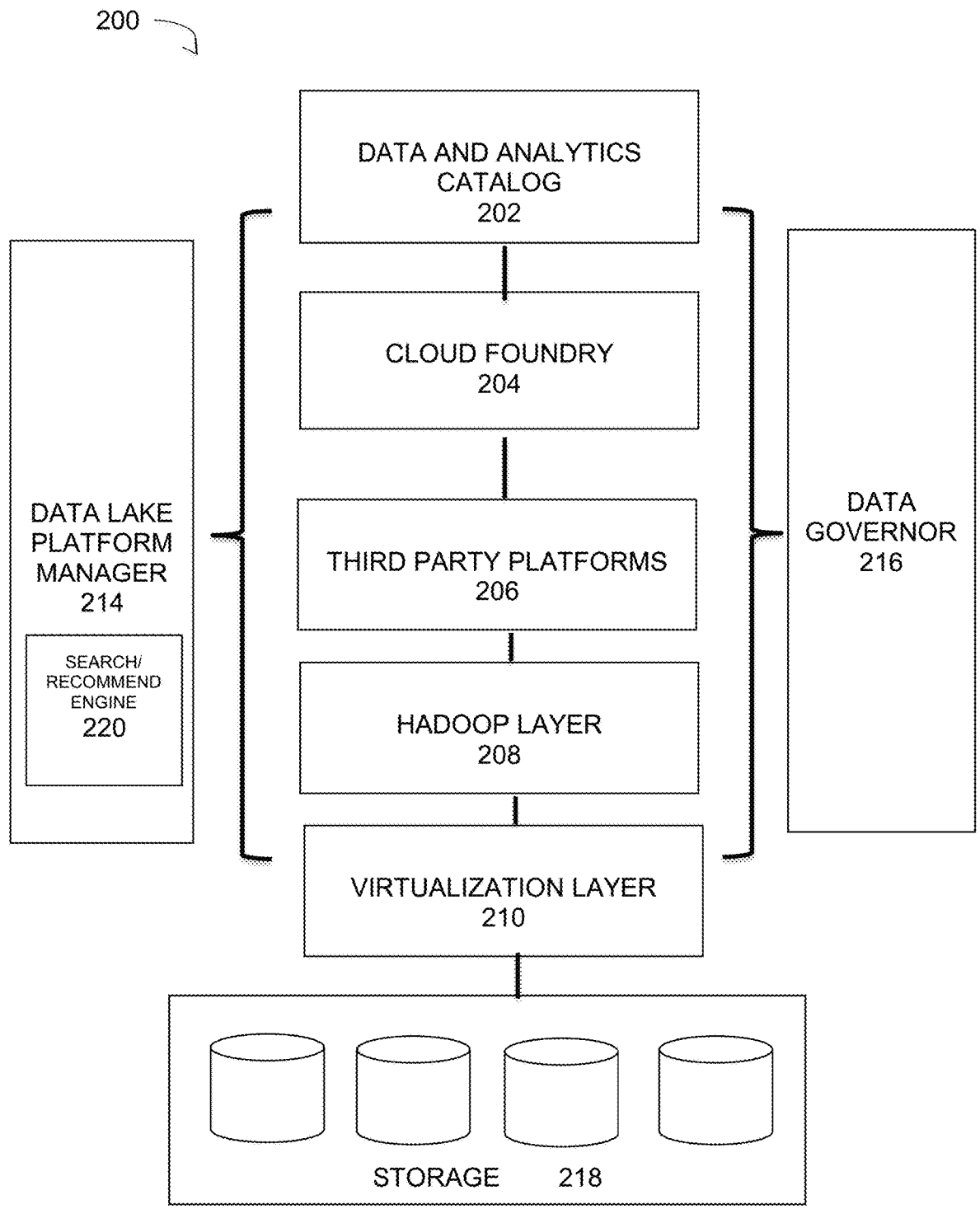
FIG. 2 illustrates components of a federation business data lake platform under some embodiments.

Server 102 represents and FBDL server that executes the FBDL platform manager process 112, which is a hardware and software solution that enables businesses to deploy big data at scale, quickly and securely, across the enterprise. The FBDL platform consists of various layered infrastructure components, as shown in FIG. 2. As shown in FIG. 2, the layers of system 200 include a data and analytics catalog 202, cloud foundry 204 which provides a platform for cloud applications, third party application and platforms 206, a Hadoop layer which is an ecosystem of open source components that controls storage, process, and analysis of the data, a virtualization layer 210, and the physical storage 218. A data lake platform manager 214 and data governor 216 control the layers of system 200. The data governor 216 dictates the security and access restrictions to the data within the system, such as LDAP (lightweight directory access protocol) rule engines. In an embodiment, the search and recommendation engine 220 is a functional component with the platform manager 214, and may be implemented as a plurality of program routines or modules, or hardware components executing program instructions.

The FBDL platform 200 provides a consolidated storage space for an enterprise, with effective support for all major platform challenges through the federation of the services shown in FIG. 2 and third party vendors. The FBDL server and platform provide wide-ranging data access and control services, such as security, governance, auditing, and cataloging, among others. These services generally ensure that even if the data lake is huge and full of complex data, users can find what they need if they know what to look for. Using traditional FBDL processes, however, users in relatively strictly defined business units cannot easily leverage data from other business units without tedious manual effort to identify relevant data assets; thus collaboration is a continuing challenge in large enterprises and redundant activities with regard to data interaction are often encountered by different business units or groups of users throughout the enterprise. Such redundancies are especially prevalent among enterprises with wide geographic spread, large numbers of well-defined and separate departments, and so on. To overcome the traditional problems of data collaboration and use among different business use, the FBDL platform implements certain mechanisms to improve data collaboration among business units, and effectively punch through the organizational silos constructed around business units and perpetuated by retention of old data warehousing practices.

As shown in FIG. 1, the FBDL includes a search engine 119 and recommendation engine 120 that provide each of its users personalized suggestions on data, parsers, dashboards, models, queries, and other form of data assets based on their past behavior and the accumulated knowledge gained by all others. The recommendation engine 120 relies on past data retrieval behavior of different users, as well as the current user behavior. The basic assumption behind the operation of the recommendation engine is that if user A and user B have similar behavior, then user A's knowledge can help guide user B. The search engine 119 processes queries input by a user to find documents in the data lake that are most responsive (relevant) to the query for evaluation by the recommendation engine 119. In an embodiment, the search and recommendation functions of the search engine 119 may be provided as separate processing functions and components, or they may be integrated into a single component that may be referred to interchangeably as a search engine or recommendation engine.

In an embodiment, system 100 includes a search engine 120 that examines a body of data (e.g., a data lake), such as the FBDL, in a systematic way for particular information specified in a textual search query input by a user. The body of data may be World Wide Web content, such that the search engine performs web searches, or it may be any other body of accessible data, either public or private. The search engine may employ one or more indexing schemes that associate words and other definable tokens to location or storage information (e.g., associating web pages to their domain names and HTML-based fields). A query from a user can be a single word, multiple words or a sentence, and the index helps find information relating to the query as quickly as possible. A user enters a query into the search engine as one or more keywords, and the index already has the names of the sites or locations containing the keywords, and these are instantly returned in response to the query from the index. If more than one response is returned for a query, they can be ranked in order of most to least relevant to the query based on number or closeness of keyword matches, and so on. As mentioned above, the recommendation engine 120 may be a component within the search engine 119, or vice-versa. Similarly, both of these engines could be provided as separate functional components in system 100.

Figure 3:
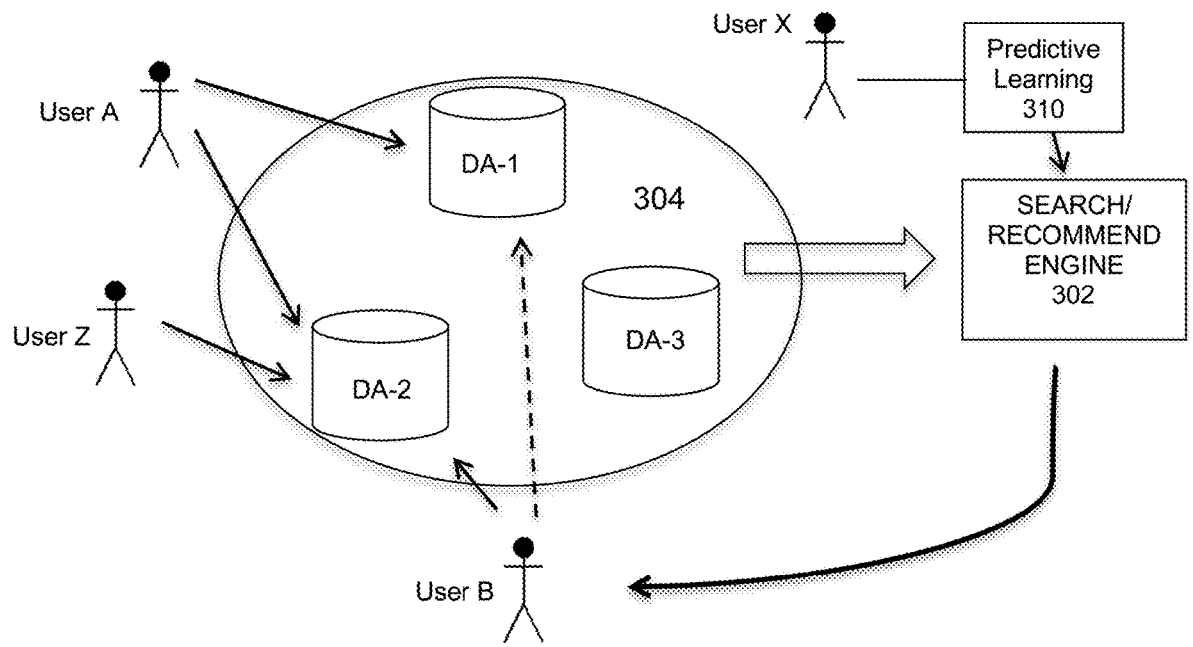
FIG. 3 illustrates operation of a search/recommendation engine in an FBDL environment under some embodiments.

FIG. 3 illustrates operation of a search and recommendation engine in an FBDL environment under some embodiments. As shown in FIG. 3, a number of users, denoted User A, User Z, and User B interact with a number of different data assets (DA-1, DA-2, and DA-3) in data lake 304. The data assets may represent any type and format of data, such as data in databases, file systems, function codes, or even applications and any data related resource that may be used by any user in the system. The interactions may be any action that views, accesses, queries, modifies or processes the data comprising any data asset. The interactions may be of any resolution, such as simple queries, analysis activity, accesses to directories, files, documents, individual data elements, and so on. In general, the system can be configured such that any activity that triggers a data storage read/write cycle will be considered an interaction. Alternatively, certain activities or resolution limits may be applied to limit the amount of data processed by the system.

In an embodiment, each interaction by a user with an asset is counted to provide a mathematical (scalar) value. This allows the recommendation engine to make a search of relevant (to a given user) data assets (sources) more efficient. The search engine 119 comprises a data collection mechanism that provides a basis of counting queries done by users on the data assets. For each query that is done against a given data assets, the recommendation engine process will increment by one a counter that describes the number of interactions that a user (user x) had with a particular data set (data set y). Table 1 below illustrates an example of user interaction counts for n users against m data assets.

TABLE 1

|        | Data 1 | Data 2 | Data 3 | Data 4 | Data 5 | Data 6 | Data 7 | ... | Data m |
|--------|--------|--------|--------|--------|--------|--------|--------|-----|--------|
| User 1 | 0      | 8      | 197    | 0      | 0      | 803    | 0      | ... | 0      |
| User 2 | 0      | 0      | 0      | 125    | 547    | 0      | 0      | ... | 0      |
| User 3 | 0      | 0      | 152    | 0      | 0      | 721    | 200    | ... | 0      |
| ...    | ...    | ...    | ...    | ...    | ...    | ...    | ...    | ... | ...    |
| User n | 0      | 0      |        | 0      | 0      | 650    | 254    | ... | 0      |

It is also necessary to consider the usage across time, so the process will generate a snapshot of these counts on a periodic (e.g., weekly) basis. The tabular raw count data is therefore not stored directly, but rather as an incremental value of a given week. This provides an ability to represent trend changes in the behavior of the user(s) across time, and not just the total interactions between a user and the assets.

This allows the system to accommodate changes in users and data assets. For example, users can change roles, use needs, or other context and any recommendation of data assets responsive to a user should take into account this contextual information when recommending a data asset. The periodicity is selected based on an assumption that in a given week (or other appropriate period), the user looks on data assets that sits within the same context. In addition, the system also maintains information about the role of the user, so that if a user switches to a different team and has a new role, the system will define him as a new user in the table so that his or her old interaction data is not mixed with their new interaction as they are not in the same context. Likewise, users are not always a user that is currently active, but can be a user that in the past used the data asset and is presently dealing with other data assets, and will thus have a new 'profile.' For example, in Table 1 above, User 5 and User 7 can be the same person in a different time and/or role, and is thus treated as two different 'users.' The interaction count data as exemplified in Table 1 is used to calculate a similarity metric, as described in greater detail below.

The various interactions throughout the system among all of the users and all of the data assets are monitored and input to the search/recommendation engine, 302. The engine 302 (or other component of the FBDL system) creates and maintains a profile of each user or groups of users. The recommendation function of engine 302 generates a relevance score to past interactions carried out by other users. The highest rating records of interaction will be provided as a possible data asset of interest and be presented as a recommendation to the user. For the example of FIG. 3, User A from a certain business unit queries the data lake or accesses data in data assets 1 and 2, while User from a different business unit queries data asset 2. These interactions are input to search/recommendation engine 302 for feedback to User B from yet another data unit. The interaction data will also be combined with other metadata associated with the data assets (e.g., owner, data steward, lineage, etc.) to provide a basis for recommending other data assets that may be used by User B. Thus, User B may be recommended to use data asset 1 based on a similarity with User A. In this manner, the recommendation engine relies on past data retrieval behavior of different users, as well as the current user behavior. It uses the assumption that if user A and user B have similar behavior, then A's knowledge can help guide B.

Figure 4:
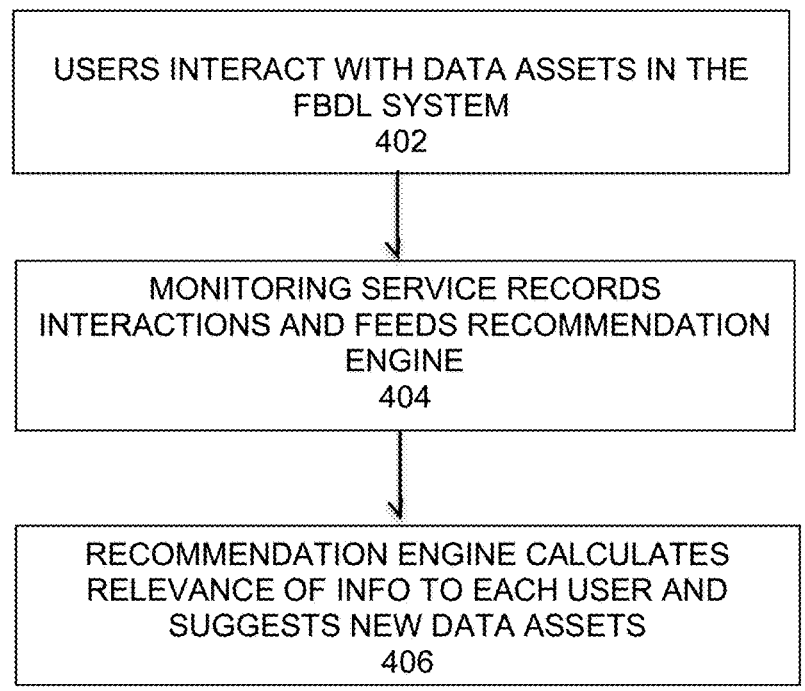
FIG. 4 is a flowchart that illustrates a method of searching for and recommending data assets to users in an FBDL environment under some embodiments.

FIG. 4 is a flowchart that illustrates a method of recommending data assets to users in an FBDL environment under some embodiments. As shown in FIG. 4, the users interact with data assets in the FBDL system. This interaction can comprise users querying data, making data requests, applying parsers, running analytics, and any other appropriate data interaction, block 402. A monitoring process or component of the FBDL management server records all of the user interactions and provides a feed to the recommendation engine, 404. The recommendation engine calculates the relevance of information to each user and suggests new data assets, block 406. The recommendation engine can be configured to provide recommendations under various intervals or conditions. For example, it can be configured to provide recommendations to a user constantly such as upon every interaction by the user, or it can be configured to provide recommendations upon a set time period or after a set number of interactions or queries. Alternatively, it can be configured to provide recommendations only upon request by the user.

In an embodiment, the recommendation engine uses the similarity between users with respect to interactions with the data assets and other factors, such as user profiles, roles in the organization, connections, and so on to determine which data assets the target user may benefit from accessing based on similar users and makes recommendations on this basis. The system takes the number of user interactions (e.g., queries, access requests, etc.) and builds user profiles of each user. A user-based collaborative filtering component calculates the correlation between pairs of users, and such metrics may be calculated and stored for all possible pairs of users in the system. The degree of similarity between users and a specific target user is determined and a defined number of similar users form a cluster of users that are the most similar to the target user. Based on these users and their interactions, data assets are recommended to the user. As an example, consider an analyst denoted User A who was working on creating a resource for combining the services requests and sales leads of the enterprise's customers, and another analyst denoted User B who wants to identify market segmentation for her core technologies division customers. In theory User B could simply ask User A for help, but the reality is that in a typical organizational structure he would not be aware of User A's work. In this case, User B would probably have to start his segmentation process from scratch every time. However, if his queries were very similar to those used by User A, the recommendation system would recommend User A's data assets to him automatically. The system has determined that User A and User B are sufficiently similar so that the interactions of each can be used make recommendations for the other. The recommendation engine provides each of its users a personalized suggestion based on their past behavior and the knowledge gained by others, and thus represents an effective collaboration tool and efficient data location method.

Figure 5:
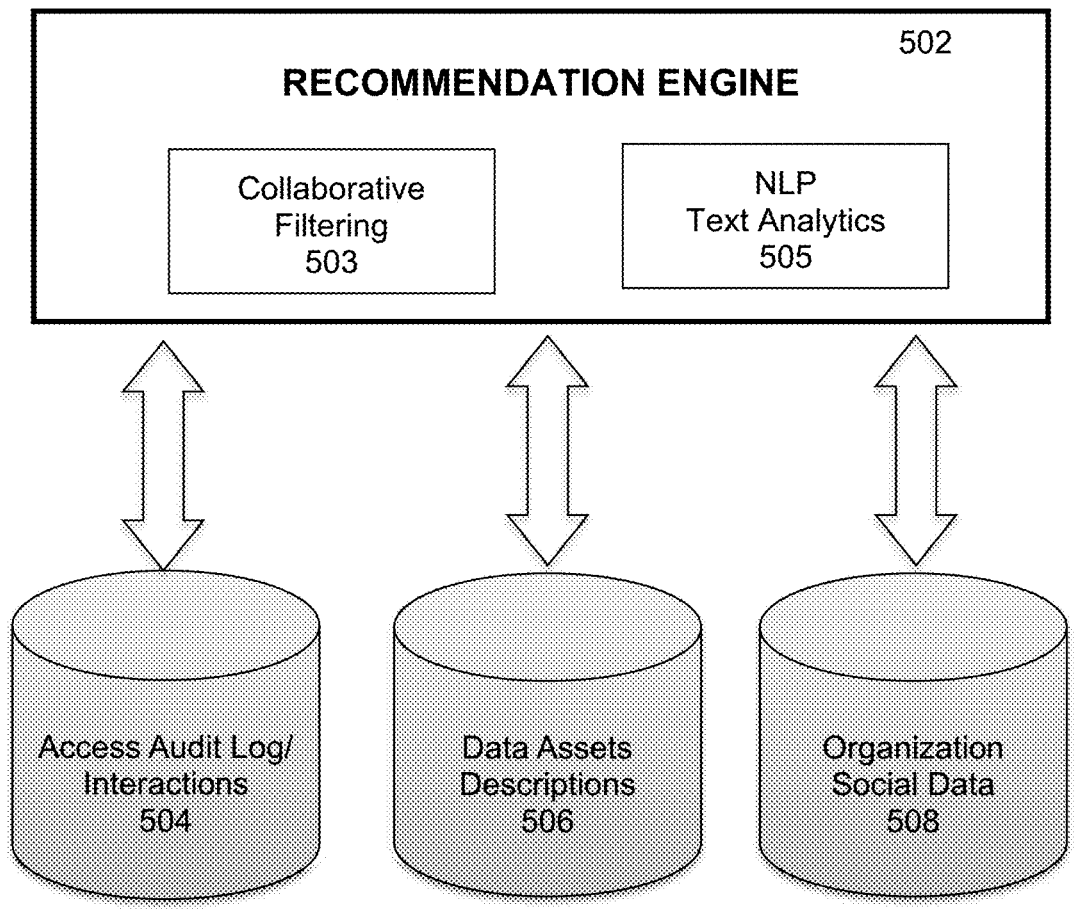
FIG. 5 illustrates a composition and operation of a recommendation engine under some embodiments.

FIG. 5 illustrates a composition and operation of a recommendation engine under some embodiments. As shown in FIG. 5, the recommendation engine receives information from a number of data sources. One data source is the access audit log or logs 504 that log all interactions of the users with the data assets in the FBDL system. Another data source is the data asset descriptions or descriptors 506 that describe or categorize the data assets in terms of type, organization, content, and other relevant parameters. The third data source is the organizational social data 508, which stores all of the formal and informal social information shared among users in the system. These can include any appropriate source, such as forums, chat rooms, social media postings, interactive help desks, and so on.

The recommendation engine 502 receives the input from the data sources and includes a collaborative filtering component 503 and a natural language processing (NLP) component 505, among other components, for processing the inputs from the data sources. The collaborative filtering component 503 processes the information for social collaboration. The NLP component 505 performs text analytics to produce the recommendation of data assets to a target or subject user (user of interest).

Figure 6:
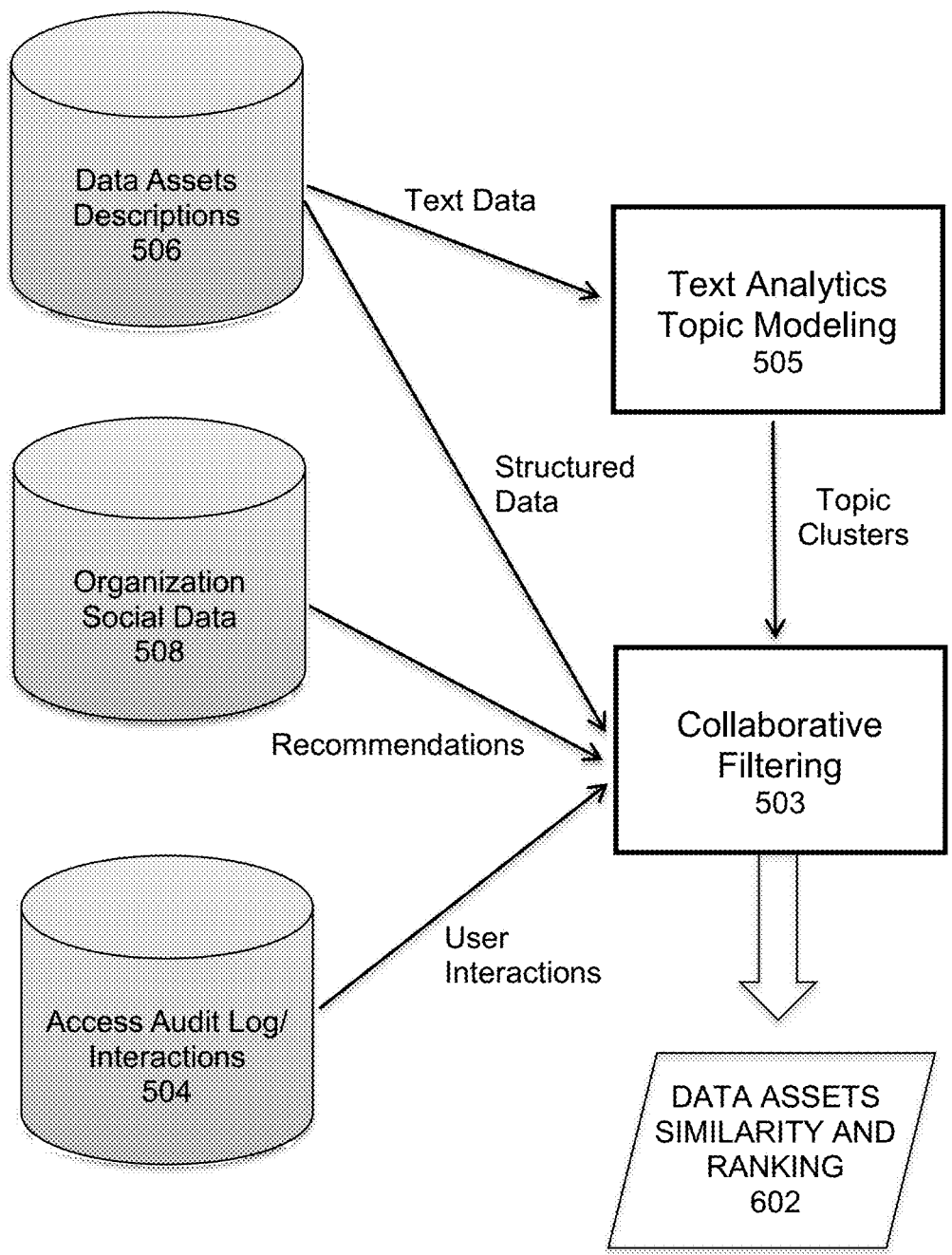
FIG. 6 illustrates the processing of data in the recommendation engine of FIG. 5, under some embodiments.

FIG. 6 illustrates the processing of data in the recommendation engine of FIG. 5, under some embodiments. As shown in FIG. 6, the three data sources, the data assets descriptions source 506 provides data in the form of text data to a text analytics (topic modeling) component 505, and in the form of structured data to the collaborative filtering component 503. The output of the text analytics module 505 is provided to the collaborative filtering component 503 as topic clusters that represent the data assets as accessed by the users. The social data source 508 provides its data in the form of recommendations to the collaborative filtering component 503. In an embodiment, an analysis component parses all of the data comprising social data 508 and pulls information relating to data assets associated with each user. These then form the basis of the recommendations sent to the collaborative filtering component. For example, a social media platform in which certain users refer to (and not just interact with) data asset would be marked as a data asset associated with that user for purposes of similarity calculations. The audit log source 504 provides the direct information regarding user interactions. The audit log can be configured to store interaction data resulting from user queries, read/write (R/W) operations, downloads, etc., in a standard format and for any resolution of interaction with regard to data set size and type of interaction. The audit log also contains a history of the target user's own interaction usage. In this manner, historical data for the target user himself is factored into recommendations for present data asset interaction.

With respect to the audit log 504 processing, the recommendation engine can be configured to parse the log to normalize the input in a pre-processing step. This normalized data input as a defined data structure to the collaborative filtering engine 503, which then processes the various inputs [Data_Asset_Text_Data+Data_Asset_Structured_Data+ Recommendations+User_Interactions+Topic_Clusters] to form an output comprising data assets similarity and ranking 602.

In an embodiment, a function for calculating an amount of interaction of a particular user with a particular asset may be given as shown in Equation 1:
where:

$$\overline{v}_i = \frac{1}{|I_i|} \sum_{i \in I_i} v_{i,j}$$

$v_{i,j}$=number of interactions of user i with data asset j (e.g., from Table 1);

$I_i$=data assets that user i has accessed; and $|I_i|$=a scalar value denoting the number of assets that user i has accessed;

In this Equation 1, The number of interactions, $v_{i,j}$, equals the count number, such as derived from Table 1, for each user i against each asset j. The calculated value, $\overline{v}_i$ is the mean vote for user i and is the sum of the number of interactions ($v_{i,j}$) multiplied by the reciprocal of the number of assets that the user has accessed, and this mean vote value represents the average amount of interactions per asset by user i. For example, if the number of assets interacted with by a user is five then the, scalar value $|I_i|$=5, and the summation value is multiplied by ⅕ to get the average amount of interactions for the assets.

The predicted relevancy of data item j for "active user" a is a weighted sum (where c is a normalization factor), and is calculated as shown in Equation 2:

$$p_{a,j} = \overline{v}_a + c \sum_{i=1}^{n} w(a, i)(v_{i,j} - \overline{v}_i)$$

where w(a,i)=the weight of similarity between users a and i. This weighting factor may be set to a default initial value (e.g., 1.0) and increased or decreased based on certain defined factors, such as an amount of interaction between the users, objective similarities of the users (e.g., age, affiliation, gender, etc.), and so on.

This calculation of Equation 2 represents and may be presented to the target user in the form of ranking suggestions for one or more data assets for interaction by the target user. With respect to the above equation, the process presents to the user the top k data assets, that is, those with the highest prediction value, p. The recommendation engine analyzes the data assets and tries to predict for the target user based on similar users ranked by their data asset interactions. A pre-defined maximum number of data assets (e.g., 5 to 10) may be recommended to the user based on the needs and constraints of the system.

The recommendations may be output to the target user through a GUI (graphical user interface 121) using known GUI principles and technology. The output of the collaborative filter engine 503 may first be passed through other data asset filtering processes that may be defined by other processes of systems 100 and 200. For example, access to certain data assets may be strictly restricted to personnel, as defined by LDAP security and policy protocols, and other similar processes, such as implemented in data governor 216. In this case, the recommendation output 602 is first sent through a LDAP process to determine if the target user is restricted from interacting with any of the recommended data assets. If so, such data assets are removed from the recommendation list. The LDAP and other filtering processes may be applied earlier in the process as well, such as during the formation of the user profiles or the similarity ranking stage among users, for example.

Figures 7, 8:
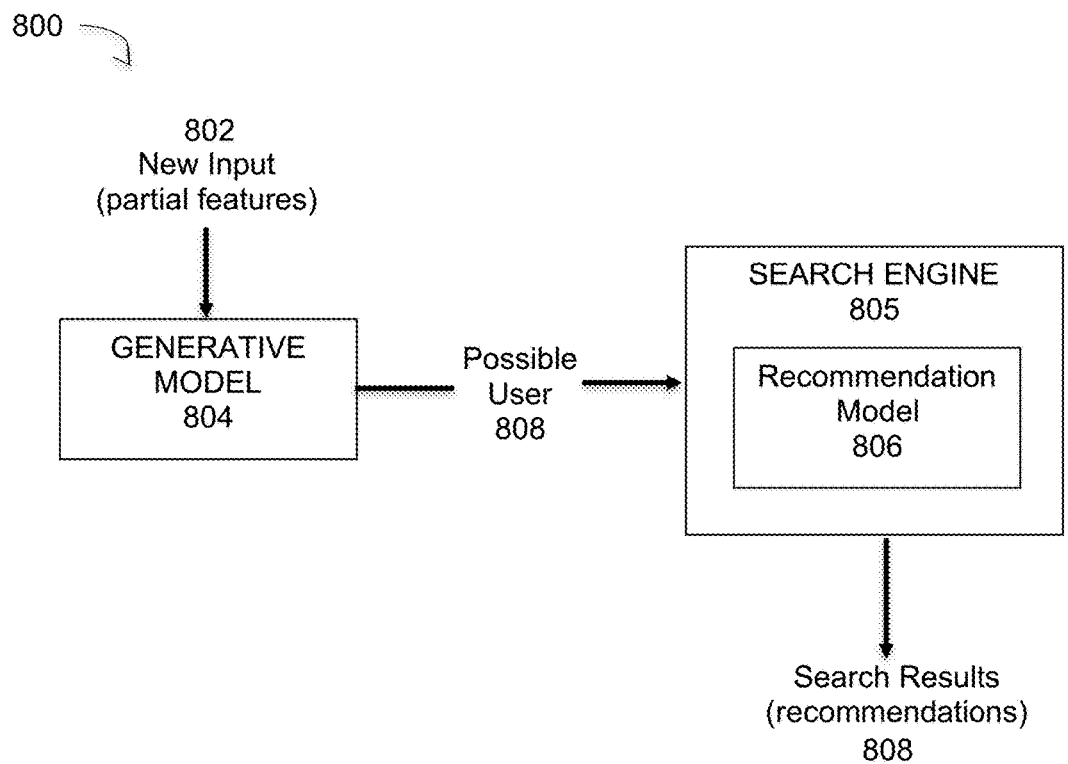
FIG. 7 illustrates a portion of an example Table that stores user interactions with data assets under some embodiments.
FIG. 8 is a system that includes a generative model to perform searches using only partial information of features for a searching user, under some embodiments.

The similarity among users is primarily calculated based on data asset interactions. Such interactions for all users and data assets may be stored in a relatively simple (but likely very large) Boolean table. FIG. 7 illustrates a portion of an example Boolean table that stores data of user interaction with data assets under some embodiments. As shown in Table 700, each user (User A, User B, User C, etc.) has a row entry in the table, and each data asset (DA-1, DA-2, DA-3, . . . , DA-N) has a column entry in the table. Each user's interaction with a data asset is marked as a Boolean value, such as 0 for no interaction and 1 for interaction. Table 700 is intended to be an example of a data access data structure, and many other implementations are possible. This data access table is used to build a user profile for each user. Such a Boolean table 700 can be used to build an overall user count table, as exemplified by Table 1 above.

In an embodiment, other parameters are also used to build the user profile. These can include roles within the organization by department (e.g., Sales vs. Engineering vs. Manufacturing, etc.), informal associations (e.g., clubs, social networks, geographical location, etc.), gender, age, title, and any other parameter that may inform which data assets might be common among any pairs of users.

In an embodiment, the similarity ranking between any two users is calculated from a combination of the data asset interaction correlation, as well as any of the other parameters, according to a weighted or scaled combinatorial algorithm. The similarity of two users (A) and (B) can be calculated as a cosine similarity as follows in Equation 3:

$$sim(a, b) = \frac{A \cdot B}{\|A\|\|B\|}$$

In an embodiment, the recommendation engine may apply different combinatorial rules to determine similarity and/or recommendations based on the profile of the target user. For example, a senior target user may be tasked with specific projects within the company and may have a long history of data interactions for specific purposes. In this case, such a user may be provided recommendations based solely on the data asset interaction correlation with other users. In this case, the audit log input 504 would be the only or primary basis of similarity comparison with the other users. On the other hand, a new user with little or no meaningful history of data asset interaction and need learn about the data assets may be treated differently by the recommendation engine. In this case, similarities with other users may be determined based on phrases or text provided by the social data source 508 or by descriptions of data assets 506. In an embodiment, the process includes a dynamic process that automatically considers the profile of the target user (e.g., seniority, role, needs, etc.) to determine an appropriate similarity correlation based on the different data sources.

Certain optimization processes may be used to improve the similarity calculations. For example, the recommendation engine can use additional features that will include the user's role, years of experience, geographic location, organization, and so on. Certain machine learning and artificial intelligence tools can then utilize learning models to determine how likely a data asset in the FBDL is responsive to a given user query. For example, this can be done by fitting a model, such as an ensemble classification tree (e.g. XGBoost, RF, etc.) that was trained on the features and used the data assets that users interacted with in the past as the labels. This model can then generate a probability per each recommendation based on features such as user role, experience, organization, location, and so on. After the model starts to run and is built up, the process can enrich it using feedback. For example, if a user creates an interaction with the recommended asset, the weight of the relation between the asset to the user attributes can be increased, and so on.

Using Generative Models for Searches with Partial Information

Embodiments described above include search and data retrieval processes that rely at least in part on established or discovered usage and access patterns. In certain cases, however, this information is not available, such as in the case of new users or users for whom only partial information is available. Embodiments thus include methods that perform data searches and return results to provide recommendations for such new users or users with only partial information.

In general, there are two main ways to represent a usage pattern, such as the pattern of data accesses by users to data assets in a system, such as illustrated in FIG. 3. First is as a sequence of actions, where each action has its own representation with features relating to aspects such as time (or time difference since the last action), the action itself, the assets it interacted with, the actor, and so on. Second is a graph form where nodes constitute actions, assets and actors. The actor has an edge to all actions, actions have edges between them in sequence, and each action also has an edge to the data assets it affects.

Artificial intelligence (AI) and machine learning (ML) systems have progressed greatly with respect to learning from massive amounts of carefully labeled data in so-called 'supervised learning' contexts. However, comprehensively labeled data is frequently unavailable in many if not most applications. Self-supervised learning (SSL) has been developed to enable AI systems to learn from incomplete or partial data situations to provide what can also be referred to as 'predictive learning.'

Self-supervised learning (SSL) obtains supervisory signals from the data itself, often leveraging the underlying structure in the data. The general technique of self-supervised learning is to predict any unobserved or hidden part (or property) of the input from any observed or unhidden part of the input. For example, it is common in natural language processing (NLP) systems to hide part of a sentence and predict the hidden words from the remaining words. Similarly, it is also possible to predict past or future frames in a video (hidden data) from current frames (observed data).

Since self-supervised learning uses the structure of the data itself, it can make use of a variety of supervisory signals across co-occurring modalities (e.g., video and audio) and across large data sets, all without relying on labels. A method used to train NLP systems by masking or substituting some input words belongs to the category of contrastive methods. But they do not use the joint embedding architecture. Instead, they use a predictive architecture in which the model directly produces a prediction for y. One starts for a complete segment of text y, then corrupts it, e.g., by masking some words to produce the observation x. The corrupted input is fed to a large neural network that is trained to reproduce the original text y. An uncorrupted text will be reconstructed as itself (low reconstruction error), while a corrupted text will be reconstructed as an uncorrupted version of itself (large reconstruction error). If one interprets the reconstruction error as an energy, it will have the desired property: low energy for "clean" text and higher energy for "corrupted" text. This applies generally in the context of NLP (text), the same concepts can be also applied to graphs.

For deep models trained in supervised mode, when labeled samples are limited, self-supervised learning (SSL) has emerged as a way to make use of large amounts of unlabeled samples, such as for NLP applications. Recently, there is a trend to extend these successful techniques to graph data using graph neural networks (GNNs). Embodiments thus use techniques that extend SSL to graph data using graph neural networks (GNNs).

Embodiments of system 100 include a generative model component 121 that uses reconstructive SSL for graph representation to generate possible values for the missing features, where it is should be understood that a sequence is a subcase of a graph. Such a component is used by recommendation engine 120 of search engine 119 to return salient search results and provide recommendations for users of system 100 who may be new or for whom incomplete, little or only partial information is available. As shown in FIG. 3, there are a number of users, denoted User A, User Z, and User B whose profile and past interaction with a number of different data assets (DA-1, DA-2, and DA-3) in data lake 304 is known. Other users, such as user X may be new or unknown to the system. Certain objective information about the user (e.g., age, gender, residence, etc.) may be unknown, however more typically access patterns to data assets will not be known, especially in the case of new users.

FIG. 8 is a system 800 that includes a generative model to perform searches using only partial information of features for a searching user, under some embodiments. In system 800, new input for a new or unknown user comprising only partial features 802 is input to a generative model 804 for the possible user 808. The search engine 805 then processes any queries from this user to produce search results and recommendations 808 from the recommendation model 806.

The generative model is a model that includes the distribution of the data self, and indicates how likely a given example is. For example, models that predict the next word in a sequence are typically generative models because they can assign a probability to a sequence of words. Formally, a generative model is a statistical model of the joint probability distribution $P(x, y)$ on given observable variable and target variable y.

For the embodiment of FIG. 3, the prediction concerns likely patterns of access of unknown user X with the data assets DA-x in federation data lake 302. These predicted access patterns are then used to generate similarity scores, as is down for the case of known users A, B, Z in which actual known (historical) access data is used for their respective similarity scoring. In this manner, data usage patterns can be predicted for any number of unknown users, and this information can further help inform the search engine processing to return relevant results to a target user. In this manner, modeled behavior of unknown users (instead of relying on only known users) can help formulate similarities that can refine the search engine process to return salient results and recommendations.

Figure 9:
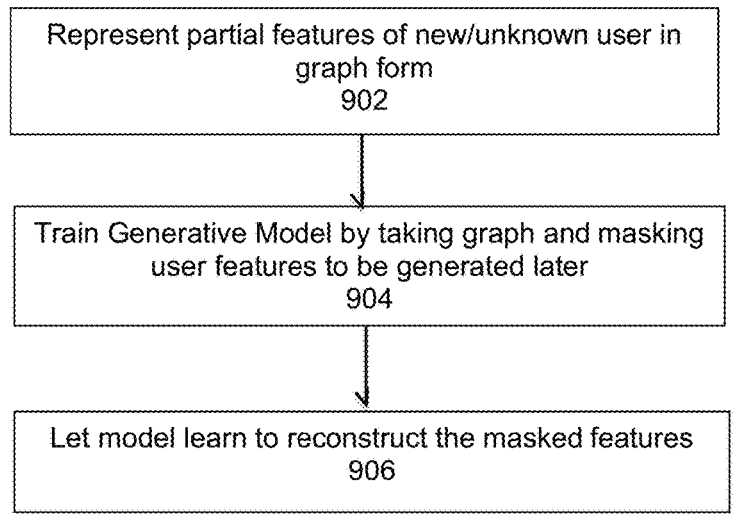
FIG. 9 is a flowchart that illustrates a process of using a generative model to perform searches using only partial information of features for a searching user, under some embodiments.

FIG. 9 is a flowchart that illustrates a process of using a generative model to perform searches using only partial information of features for a searching user, under some embodiments In an embodiment, the process of FIG. 9 begins by representing partial features of the new or unknown user in graph form, 902. This is followed by model training. The generative model training is done by first taking the graph and masking the user feature or features that are to be generated later, 904. It then lets the model learn to reconstruct those features, 906. The information that is generated should basically replace missing values, i.e., those for which there is no information about the user. These constitute possible values that are likely to have been the user's if they were shared by the user. As such, they do not have parameters of their own, just their values. This could be, for example, the age of a user that has not supplied their age, but that can be deduced based on the information that has been supplied to the system, such as search patterns, educational level, and so on.

For this embodiment, only one value is provided to the generative model. This is basically the 'inference stage' of the AI model, so it may be considered to be an automatic process and no further processing is needed. For inference, the graph is provided with the partial features of the user and the trained model will reconstruct the missing information. This can then be used to generate a possible user 808 for the input to the search/recommendation engine. Thus, as shown in FIG. 3, data from known users A, B, Z with respect to access to data assets is input directly to the search/recommendation engine 302, while data for a new or unknown user X is predicted by predictive learning process 310 using SSL and generative model techniques for input to the search recommendation engine 302.

In this manner, system 100 uniquely uses generative algorithms to generate partial input to search and data asset recommendation engines to return search results and provide recommendation with only partial user data.

The recommendation system for FBDL data assets as described herein allows users to leverage the knowledge gained by others while leveraging the entire enterprise data. Traditionally a time consuming task, the recommendation engine automates the process of determining user similarities and correlating data access interactions throughout the entire enterprise to make meaningful recommendations of likely data assets to target users. Unlike present solutions of data management in a lake environment that focus on data asset cataloging, governance and audit, none aim to improve collaboration between end users (that is, focus on the customer's IT department and not their business users). It provides context-based rather than content-based data management and is an important tool for punching holes through organizational silos. With respect to automatic guidance for data exploration, some existing solutions enable interactive reporting of other users' interactions with different datasets. However, none of them automatically guide the user for the relevant next step with respect to which data assets the user should access.

Embodiments of the processes and techniques described above can be implemented on any appropriate backup system operating environment or filesystem, or network server system. Such embodiments may include other or alternative data structures or definitions as needed or appropriate.

Figure 10:
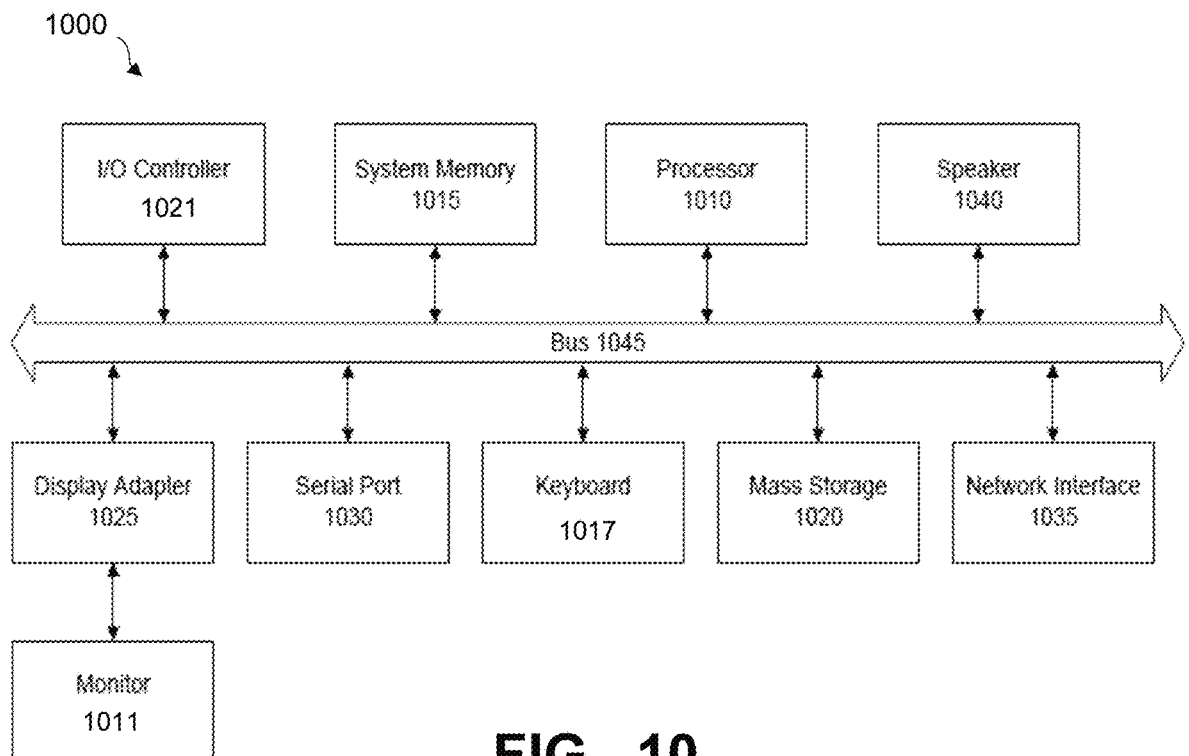
FIG. 10 is a system block diagram of a computer system used to execute one or more software components of the methods and processing component described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 is a block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is only one example of a computer system suitable for use with the present system. Other configurations of subsystems suitable for use with the present invention will be readily apparent to one of ordinary skill in the art.

The network 110 may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x, near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated "with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. Method steps may also be embodied as executable program code executed in a processor based system, such as a server computer or client computer coupled in a network. The terms, "component," "module," "procedure," "unit," "engine" may all refer to a circuit that executes program code to perform a function implemented in software.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media). In the context of this disclosure, a computer-usable medium or computer-readable medium may be any physical medium that can contain or store the program for use by or in connection with the instruction execution system, apparatus or device.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A server computer-implemented method of processing queries input to a data retrieval system storing data assets for users in an enterprise, comprising:

storing, in a federation business data lake (FBDL) storage maintained for a large-scale data processing system, data assets retrievable by a user;

providing a search engine for entry of queries by users looking for data in the FBDL;

monitoring and recording, by a monitoring component of the server, all interactions of a plurality of known users, including a first user and a target user, each interaction comprising an activity that triggers a read/write cycle to the FBDL storage;

first deriving a similarity of each of the plurality of known users to the target user based on respective past and current data retrieval patterns of each of known users for data queried in the search engine;

identifying an unknown user for whom there are no known interactions with the plurality of known users or the data assets to constitute missing features;

generating a graph for the unknown user representing data asset interactions for the unknown user;

training a generative model that uses reconstructive self-supervised learning (SSL) techniques for the graph to generate possible values for the missing features;

second deriving a similarity of the unknown user to the target user based on the trained model; and returning a result to a query input to the search engine by the target user based on the similarity of the known users to the target user and the similarity of the unknown user to the target user.

2. The method of claim 1 wherein the graph comprises nodes that constitute actions, assets and actors of the interactions, and wherein an actor has an edge to all actions, actions have edges between them in sequence, and each action also has an edge to the data assets it affects.

3. The method of claim 2 wherein the actor comprises the unknown user.

4. The method of claim 2 wherein the training step comprises
taking the graph and masking the user data access feature that is to be generated later;
letting the generative model learn to reconstruct this feature; and
replacing the masked user data access feature with the reconstructed feature.

5. The method of claim 4 further comprising, for the known users:
measuring a number of interactions of the first user with the data assets;
calculating an average number of assets accessed by the first user;
receiving the query in the search engine from the target user to access a desired data asset;
calculating an amount of interaction of the target user with the data assets based on their respective number of interactions; and
comparing a similarity of the first user to the target user based on respective past and current data retrieval patterns of each of the first user and target user for data queried in the search engine.

6. The method of claim 5 further comprising factoring a user profile into the similarity by:
building a respective user profile of each of the first user and the target user based on their respective organizational roles, informal social associations, gender, and age; and
calculating a similarity ranking between the target user and the first user based on the compared similarity and the respective profiles of the target user and the first user.

7. The method of claim 6 further comprising calculating a relevance score of the desired data item relative to other data items for the target user based on the amount of interaction of the first user and a weighted sum quantifying the similarity ranking between the first user and the target user to identify one or more relevant data assets responsive to the query input by the target user.

8. The method of claim 7 wherein the relevance score represents a predicted relevance that comprises the target user's past interactions with the data assets and the cumulative interactions of other users including the first user with the data assets, such that if one or more of the other users has similar interaction behavior to the target user, then knowledge of the one or more other users can impact the relevance of the information with regard to one or more new data assets predicted to be useful to the target user.

9. The method of claim 8 wherein the relevance score is modified by the similarity of the unknown user to the target user and the similarity of the first user to the target user.

10. The method of claim 1 wherein the user interaction of the known users with the data processing system, and predicted interaction of the unknown user comprises querying data, making data requests, applying parsers, and running analytics on data elements making up the data assets.

11. The method of claim 10 wherein the data processing system is maintained by a large scale enterprise, and wherein the data assets comprise Big Data-scale data sets, and wherein the data assets comprise databases, stacks of databases, file systems, and enterprise services, and wherein the data assets are accessed through a Hadoop layer storing open source software components to control storing, processing, and analyzing the data.

12. A method of processing queries input to a data retrieval system storing data assets for users in an enterprise, comprising:
storing, in a federation business data lake (FBDL) storage maintained for a large-scale data processing system, data assets retrievable by users and related to products searched for by the users;
deriving a similarity of a target user to one or more known users based on respective past and current data retrieval patterns of each of known users for the products searched for by the users in a search engine query, and respective user profiles for each of the target user and one or more known users;
receiving input for an unknown user comprising only partial features for either search activity or profile, for processing using a generative model and resulting in missing features;
training a generative model using reconstructive self-supervised learning (SSL) techniques to generate possible values for the missing features;
predicting, using the trained generative model a likely pattern of search engine access of the unknown user with the products;
calculating, from a set of user interaction counts, a predicted similarity of the unknown user to the one or more known users based on the predicted likely pattern of search engine access; and
returning a result to a query input to the search engine by the target user based on the the similarity of a target user to one or more known users and the predicted similarity of the unknown user to the one or more known users.

13. The method of claim 12 further comprising:
generating a graph for the unknown user representing data asset interactions for the unknown user.

14. The method of claim 13 wherein the training step comprises:
taking the graph and masking the user data access feature that is to be generated later;
letting the generative model learn to reconstruct this feature; and
replacing the masked user data access feature with the reconstructed feature.

15. The method of claim 12 wherein the predicted interaction of the unknown user comprises querying data, making data requests, applying parsers, and running analytics on data elements making up the data assets.

16. The method of claim 15 wherein the data assets are maintained in a processing system maintained by a large scale enterprise, and wherein the data assets comprise Big Data-scale data sets, and wherein the data assets comprise databases, stacks of databases, file systems, and enterprise services, and wherein the data assets are accessed through a Hadoop layer storing open source software components to control storing, processing, and analyzing the data.

17. A method of processing queries input to a data retrieval system storing data assets for users in an enterprise, comprising:

storing, in a federation business data lake (FBDL) storage maintained for a large-scale data processing system, data assets retrievable by a user;

providing a search engine for entry of queries by a target user looking for data in the FBDL;

receiving input for an unknown user comprising only partial features for search activity for processing using a generative model and resulting in creation of missing features;

training a generative model using reconstructive self-supervised learning (SSL) techniques to generate possible values for the missing features;

predicting, using the trained generative model a likely pattern of search engine access of the unknown user with the products;

calculating, from a set of user interaction counts, a predicted similarity of the unknown user to the target user based on the predicted likely pattern of search engine access; and returning a result to a query input to the search engine by the target user based on the the predicted similarity of the unknown user to the target user.

18. The method of claim 17 wherein the predicted interaction of the unknown user comprises querying data, making data requests, applying parsers, and running analytics on data elements making up the data assets.

19. The method of claim 18 wherein the result to the query comprises a recommendation of data assets in the FBDL most relevant to the query, and further wherein the FBDL environment is maintained by a large scale enterprise, and wherein the data assets comprise Big Data-scale data sets.

* * * * *